US011820588B2

(12) United States Patent
Harweger

(10) Patent No.: US 11,820,588 B2
(45) Date of Patent: Nov. 21, 2023

(54) SYSTEM AND METHOD OF MANIPULATING AIRFLOW IN A GRAIN MASS

(71) Applicant: HABER TECHNOLOGIES, INC., Ames, IA (US)

(72) Inventor: Eric G. Harweger, Ames, IA (US)

(73) Assignee: HABER TECHNOLOGIES, INC., Ames, IA (US)

( * ) Notice: Subject to any disclaimer, the term of this patent is extended or adjusted under 35 U.S.C. 154(b) by 0 days.

(21) Appl. No.: 17/963,451

(22) Filed: Oct. 11, 2022

(65) Prior Publication Data

US 2023/0032823 A1 Feb. 2, 2023

Related U.S. Application Data

(63) Continuation of application No. 16/357,596, filed on Mar. 19, 2019, now Pat. No. 11,465,833.

(60) Provisional application No. 62/671,122, filed on May 14, 2018.

(51) Int. Cl.
*B65D 88/74* (2006.01)
*F26B 9/10* (2006.01)
*F26B 9/06* (2006.01)

(52) U.S. Cl.
CPC ......... *B65D 88/742* (2013.01); *B65D 88/745* (2013.01); *B65D 88/748* (2013.01); *F26B 9/063* (2013.01); *F26B 9/103* (2013.01)

(58) Field of Classification Search
USPC ........................................................... 34/201
See application file for complete search history.

(56) References Cited

U.S. PATENT DOCUMENTS

| | | | | |
|---|---|---|---|---|
| 1,020,256 A | | 3/1912 | Boll | |
| 1,359,301 A | * | 11/1920 | Wettig | F26B 17/122 34/174 |
| 1,424,565 A | | 8/1922 | Goskar | |
| 1,994,654 A | | 3/1935 | Kreuzter | |
| 2,027,268 A | | 1/1936 | Davis | |
| 2,126,107 A | * | 8/1938 | Gordon | B65D 88/742 454/177 |
| 12,126,107 | | 8/1938 | Gordon | |
| 2,299,299 A | | 10/1942 | Bills | |
| 2,601,728 A | | 7/1952 | Erfurth | |

(Continued)

FOREIGN PATENT DOCUMENTS

| | | |
|---|---|---|
| CN | 2398232 Y | 9/2000 |
| CN | 101086421 A | 12/2007 |

(Continued)

OTHER PUBLICATIONS

International Searching Authority, “International Search Report”, for PCT/US2019/032222, dated Aug. 5, 2019, 3 Pages.

(Continued)

*Primary Examiner* — Edelmira Bosques
*Assistant Examiner* — Frances F. Hamilton
(74) *Attorney, Agent, or Firm* — LAZARIS IP

(57) ABSTRACT

An assembly for saturating or aerating a medium with fluid. At least one hollow cylinder having gates and vents embedded within a grain mass. A target section of grain mass is identified and the gates and vents activated to provide influent flow to the target section in both vertical and horizontal directions.

18 Claims, 11 Drawing Sheets

(56) References Cited

U.S. PATENT DOCUMENTS

| | | | |
|---|---|---|---|
| 2,641,174 A | | 6/1953 | Oberlin |
| 2,655,734 A | * | 10/1953 | Ohlheiser ............... F26B 9/063 |
| | | | 34/174 |
| 2,656,783 A | | 10/1953 | Heal |
| 2,722,058 A | | 11/1955 | Heal |
| 2,882,612 A | | 4/1959 | Gonzalez |
| 3,078,780 A | | 2/1963 | Bottlander |
| 3,381,409 A | | 5/1968 | Lamont |
| 3,435,540 A | | 4/1969 | Sanders et al. |
| 3,531,874 A | | 10/1970 | Sukup |
| 3,949,522 A | | 4/1976 | Kehl et al. |
| 3,956,852 A | | 5/1976 | Ceausescu |
| 4,149,844 A | * | 4/1979 | Noyes ................... F26B 17/122 |
| | | | 34/174 |
| 4,249,891 A | | 2/1981 | Noyes et al. |
| 4,256,029 A | | 4/1981 | Steffen et al. |
| 4,308,669 A | * | 1/1982 | Noyes ................... F26B 17/122 |
| | | | 34/174 |
| 4,402,302 A | | 9/1983 | Westelaken |
| 4,404,756 A | | 9/1983 | Noyes |
| 4,423,557 A | | 1/1984 | Westelaken |
| 4,424,634 A | | 1/1984 | Westelaken |
| 14,486,960 | | 12/1984 | Maurice et al. |
| 4,561,194 A | * | 12/1985 | Sutch ...................... F26B 9/103 |
| | | | 34/233 |
| 4,566,205 A | | 1/1986 | Schlagel |
| 4,567,732 A | | 2/1986 | Landstrom et al. |
| 4,583,300 A | * | 4/1986 | Mast ....................... F26B 9/063 |
| | | | 454/182 |
| 4,750,273 A | | 6/1988 | Parkes et al. |
| 4,885,985 A | * | 12/1989 | Pollock ................. B65D 88/742 |
| | | | 34/232 |
| 4,910,880 A | | 3/1990 | Cole |
| 4,930,229 A | | 6/1990 | Moser |
| 5,001,859 A | | 3/1991 | Sprung |
| 5,167,081 A | | 12/1992 | Loyns |
| 5,233,766 A | | 8/1993 | Frederiksen et al. |
| 5,893,218 A | * | 4/1999 | Hunter .................... F26B 9/063 |
| | | | 34/492 |
| 6,163,978 A | * | 12/2000 | Hinner ................... F26B 21/028 |
| | | | 34/174 |
| 6,311,411 B1 | * | 11/2001 | Clark ..................... F26B 17/002 |
| | | | 34/174 |
| 6,349,485 B1 | | 2/2002 | Reed |
| 7,228,657 B2 | | 6/2007 | Brault et al. |
| 17,497,031 | | 3/2009 | Clary |
| 7,818,894 B2 | | 10/2010 | Noyes et al. |
| 7,925,469 B2 | | 4/2011 | Delin et al. |
| 8,210,126 B2 | | 7/2012 | Sia et al. |
| 8,356,420 B2 | * | 1/2013 | Morrison .............. F26B 17/124 |
| | | | 34/232 |
| 8,726,535 B2 | * | 5/2014 | Garrido .................. F26B 25/22 |
| | | | 34/493 |
| 8,850,742 B2 | | 10/2014 | Dube |
| 9,347,904 B1 | * | 5/2016 | Schaefer, Jr. ........... F26B 21/12 |
| 9,907,236 B2 | | 3/2018 | Kamp |
| 9,915,474 B2 | * | 3/2018 | Pauling .................. F26B 17/14 |
| 10,856,480 B2 | | 12/2020 | Moffitt et al. |
| 11,465,833 B2 | | 10/2022 | Harweger |
| 2004/0194371 A1 | | 10/2004 | Kinnis |
| 2007/0044445 A1 | | 3/2007 | Spicer et al. |
| 2008/0000151 A1 | | 1/2008 | Houweling et al. |
| 2009/0076658 A1 | | 3/2009 | Kinnis et al. |
| 2009/0094853 A1 | | 4/2009 | Noyes et al. |
| 2010/0083531 A1 | | 4/2010 | Hu |
| 2010/0126062 A1 | | 5/2010 | Houweling et al. |
| 2011/0219638 A1 | | 9/2011 | Schreiner |
| 2011/0252663 A1 | * | 10/2011 | Ralph ..................... F26B 9/063 |
| | | | 34/493 |
| 2012/0066924 A1 | | 3/2012 | Ando et al. |
| 2014/0041247 A1 | | 2/2014 | Schreiner |
| 2014/0046611 A1 | * | 2/2014 | Bloemendaal ....... G01N 27/223 |
| | | | 702/65 |
| 2014/0250718 A1 | | 9/2014 | Fujitomo |
| 2015/0026995 A1 | * | 1/2015 | Schaefer, Jr. ........... F26B 21/12 |
| | | | 34/88 |
| 2015/0354895 A1 | | 12/2015 | Bloemendaal et al. |
| 2016/0050948 A1 | | 4/2016 | Robbins et al. |
| 2016/0106042 A9 | * | 4/2016 | Schreiner ................ A01F 25/00 |
| | | | 34/443 |
| 2018/0038647 A1 | * | 2/2018 | Abassi ..................... F26B 21/10 |
| 2018/0058759 A1 | | 3/2018 | Wie et al. |
| 2018/0187973 A1 | * | 7/2018 | Detzel ................... F26B 17/122 |
| 2019/0166863 A1 | | 6/2019 | Ma et al. |

FOREIGN PATENT DOCUMENTS

| | | |
|---|---|---|
| CN | 1100483055 A | 4/2009 |
| CN | 101919330 A | 12/2010 |
| CN | 204762297 U | 11/2015 |
| GB | 145224 A | 7/1920 |
| GB | 2689968 A | 4/1927 |
| GB | 272316 A | 6/1927 |
| GB | 424801 A | 2/1935 |
| GB | 874058 A | 8/1961 |
| JP | S5596031 A | 7/1980 |
| JP | S57115666 A | 7/1982 |
| RU | 2034438 C1 | 5/1995 |
| SU | 845815 A1 | 7/1981 |
| WO | 2017/060823 A1 | 4/2017 |
| WO | 2018/006670 A1 | 1/2018 |

OTHER PUBLICATIONS

International Searching Authority, "Written Opinion of the International Searching Authority", for PCT/US2019/032222, dated Aug. 5, 2019, 6 Pages.

European Patent Office, Supplemental European Search Report, European Patent Office Application No. 19802700.5, dated Dec. 9, 2021.

United States Patent & Trademark Office, "Notice of References Cited", U.S. Appl. No. 16/357,596, dated Jun. 23, 2020.

United States Patent & Trademark Office, "Notice of References Cited", U.S. Appl. No. 16/357,596, dated Sep. 15, 2021.

United States Patent & Trademark Office, "Notice of References Cited", U.S. Appl. No. 16/357,596, dated Mar. 24, 2022.

* cited by examiner

SYSTEM AND METHOD OF MANIPULATING AIRFLOW IN A GRAIN MASS

CROSS-REFERENCE TO RELATED PATENT APPLICATION(S)

This patent application claims priority to U.S. provisional application 62/671,122, filed on May 14, 2018, and to U.S. non-provisional patent application Ser. No. 16/357,596, filed on Mar. 19, 2029, the contents of both of which are incorporated in their entirety herein. In accordance with 37 C.F.R. § 1.76, a claim of priority is included in an Application Data Sheet filed concurrently herewith.

BACKGROUND OF THE INVENTION

The present invention is directed to an assembly for saturating or aerating a medium with fluid. More particularly, the invention is directed to an assembly that selectively saturates cross sections of the medium within or without a container. The invention is used to saturate or coat any medium with fluid having or providing desired properties. As one example, the assembly can be used to saturate grain within a bin with air. This air may be artificially conditioned with heat, moisture, fumigants or any combination thereof. The natural air may also be accepted to be sufficient as is.

Drying grain, aerating grain, or both is known in the art. Typically, grain is placed in a pile or in a bin atop a perforated bed or floor through which air, but not grain, may pass. A pressure gradient is created such that air is forced through the grain mass to push, pull, or both ("push") a drying front through the grain. This process is passive in that the system is static; it does not react to changing conditions within the grain mass. Nor does it change the air flow patterns within the system. The drying front is pushed through the entirety of the grain mass, including the bottom tiers to the top tiers, even after these tiers, or cross sections, of the grain mass have been conditioned.

As a result, the pressure gradient that needs to be overcome is large requiring large amounts of energy to be put into the system. This energy typically comes in the form of mechanical energy, which creates the pressure gradient; and thermal energy, which facilitates the removal of moisture from grain. There also could be energy pertaining to air conditioned with fumigants. Not only is grain quality sub-optimal, but often some grain is left too wet and others too dry. Accordingly, a need exists in the art for an assembly that addresses these deficiencies.

An objective of the present invention is to provide a system that is adaptive to changing conditions within a grain mass.

Another objective of the present invention is to provide a system that is more energy efficient in conditioning a grain mass.

Another objective of the present invention is to provide a system that conditions a grain mass in less time.

Another objective of the present invention is to provide a system that more evenly conditions, preserves, or both, a grain mass.

These and other objectives will be apparent to those skilled in the art based on the following written description, drawings, and claims.

BRIEF SUMMARY OF THE INVENTION

An assembly or system for saturating and/or aerating a medium with fluid includes at least one hollow cylinder with an inlet port and an exhaust port embedded within a medium, such as a grain mass. The cylinder has at least one vent associated with an opening in the cylinder to selectively seal the opening to either prevent or allow fluid to flow from the cylinder, through the opening, and into the grain mass.

The cylinder may also have one or more gates that selectively either allow or prevent fluid from flowing from an inlet port through the cylinder, and out the exhaust port. Through the combination of cylinders, vents, and gates, the system can dynamically create multiple flow patterns to direct fluid to targeted areas or sections within the grain mass. The flow patterns are horizontal, vertical, angular, transverse, two dimensional and three dimensional.

The system also includes a plurality of sensors that detect and transmit information about conditions in the grain mass and operating parameters of the system. The detected information is combined and compared with detected data from other systems in a centralized database.

The sensed data is also used by a control system having a computer. The control system processes the detected information and dynamically activates the vents and/or gates to create desired flow patterns.

DETAILED DESCRIPTION OF THE PREFERRED EMBODIMENTS

Figure 1:
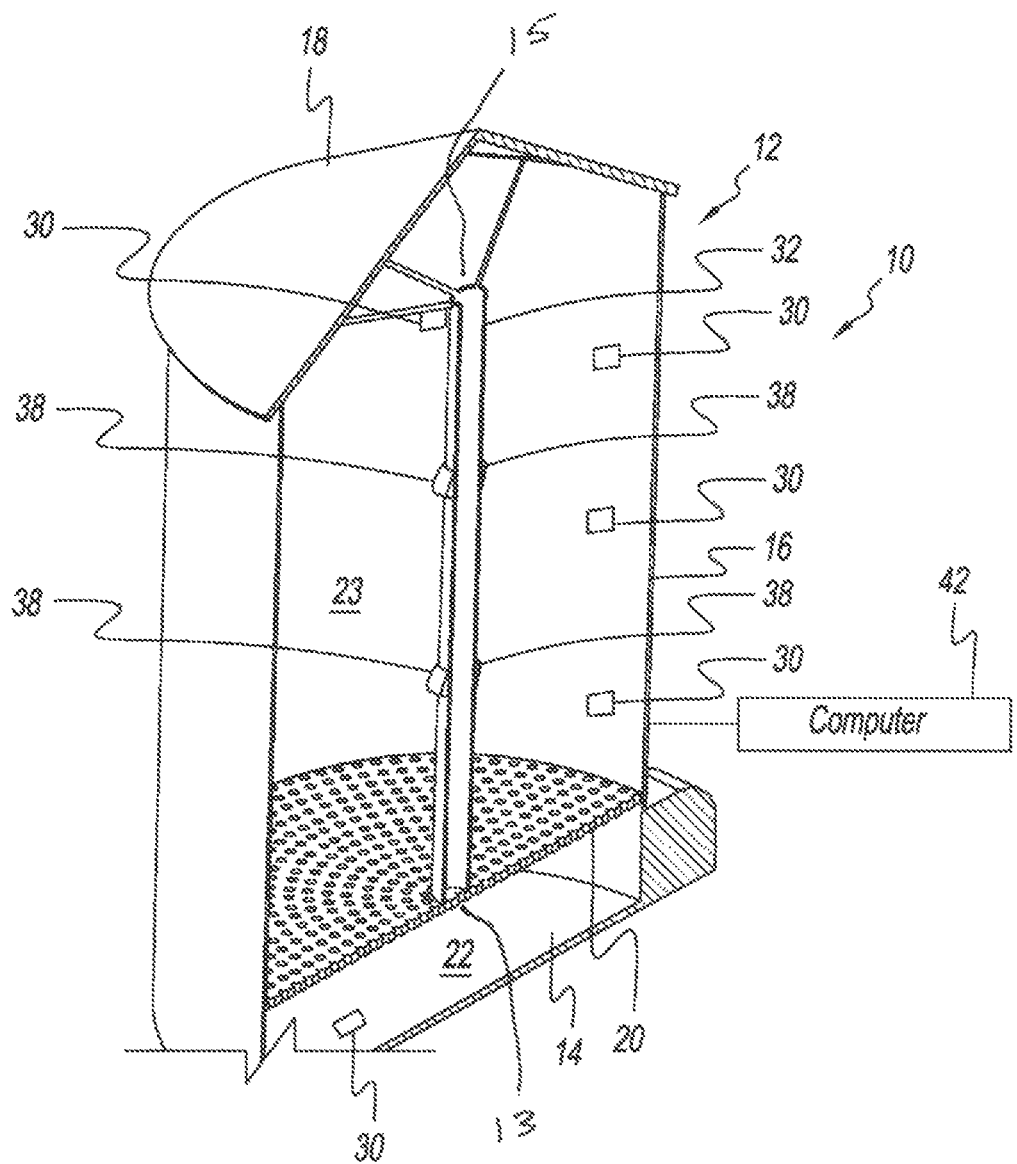
FIG. 1 is a side sectional perspective view of a saturating assembly.
Figure 2:
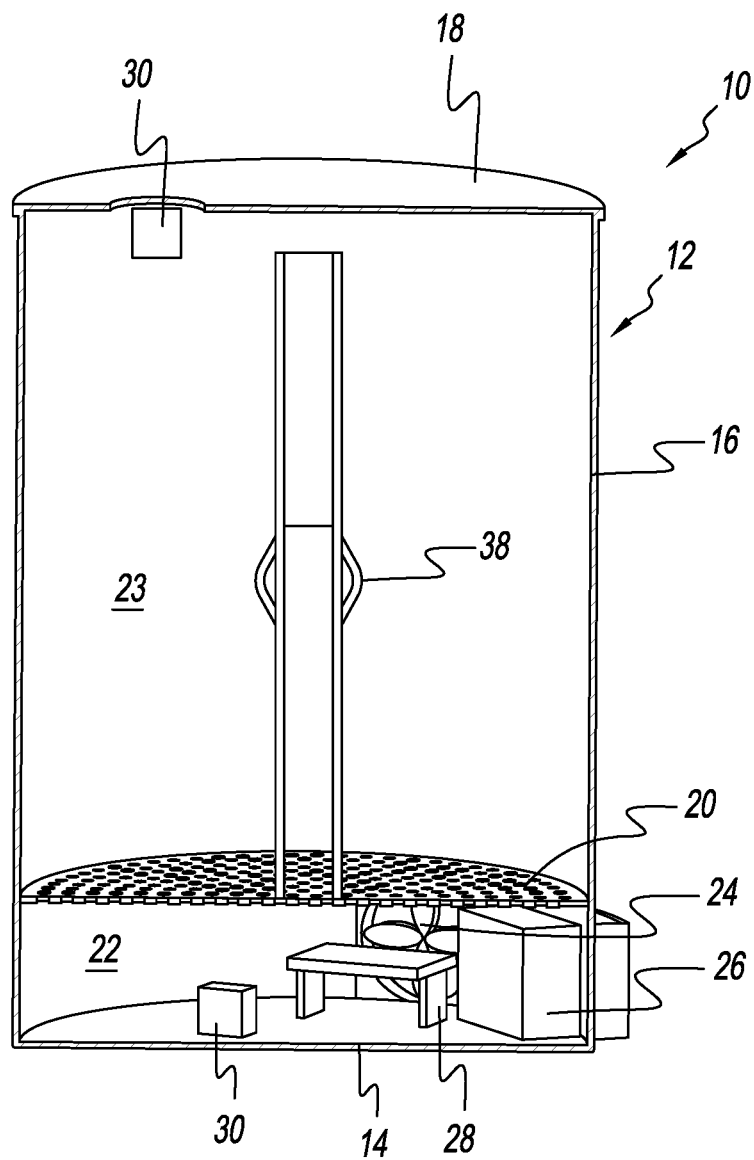
FIG. 2 is a side sectional view of a saturating assembly.
Figure 3:
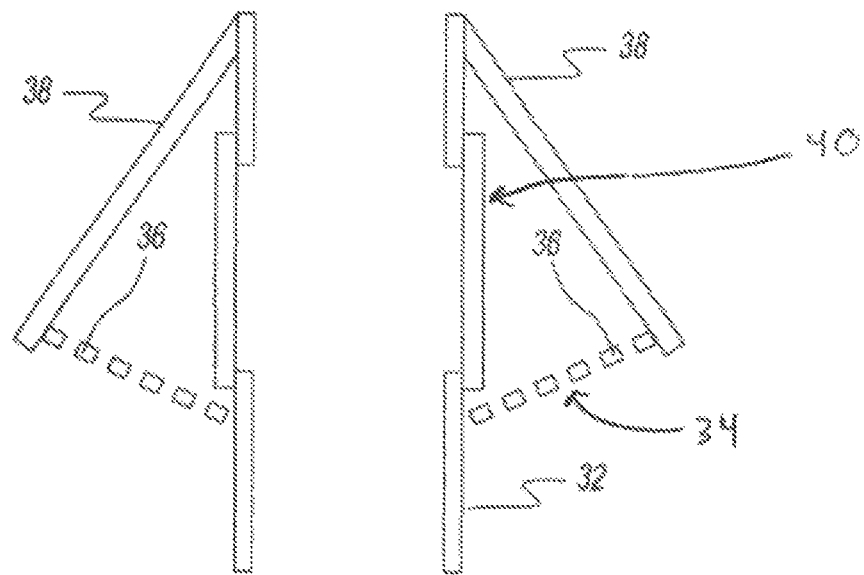
FIG. 3 is a side sectional view of a vent.
Figure 4:
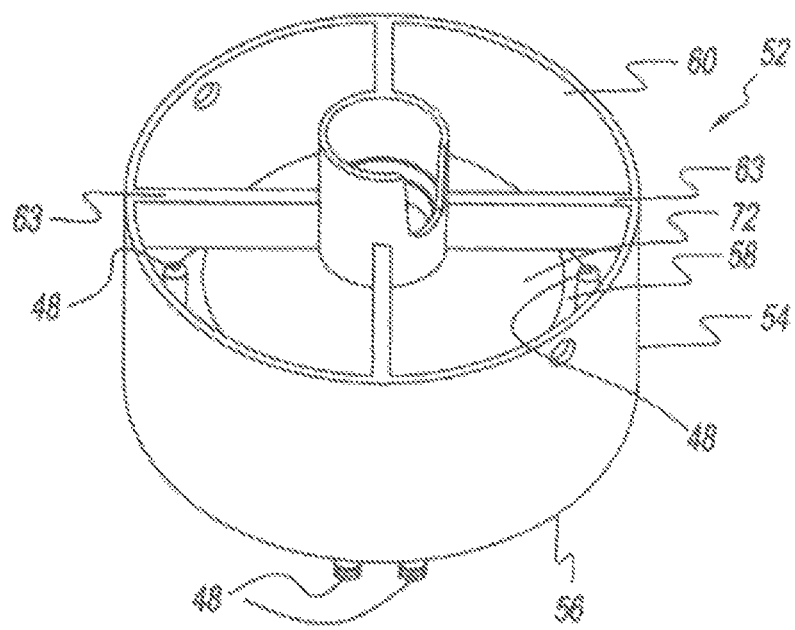
FIG. 4 is a top plan perspective view of a gate.
Figure 5:
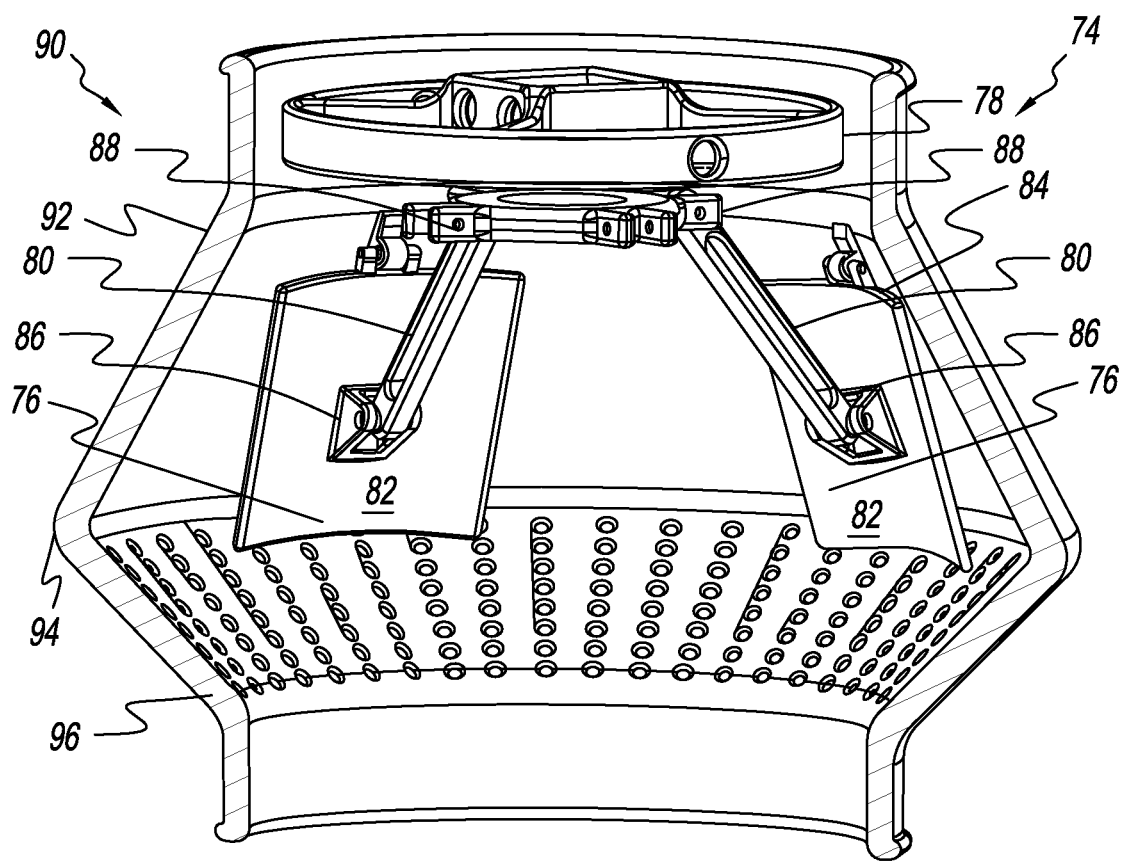
FIG. 5 is a side sectional view of a vent assembly.

Referring to the Figures, a system 10 for saturating a medium 11 with fluid includes at least one elongated hollow cylinder 32. The medium 11 is of any type, and for the purpose of explanation only, grain, such as corn to be dried, will be used as an example. The fluid is of any type including, but not limited to, liquid or gas. Saturating includes, but is not limited to, causing to process a desired property, impregnate or infuse and, in particular, referring to heat and mass transport phenomena.

The cylinder 32, having an inlet or bottom port 13 and an exhaust or top port 15 is embedded within a mass of grain 11. The grain mass 11 can be gathered in a pile that could be covered with a tarp or within a container 12. The container 12 is of any size, shape and structure including, but not limited to, a grain bin, a bulk bag, a hopper, a bucket, or the like. In one example, the container 12 includes a bottom 14, a side wall 16, and a top 18. The top 18 is of any type such as a roof, a wall, a lid, or the like.

Attached to and/or in communication with the cylinder 32 is a fan 24, a humidifier 26, and/or a heater 28, or other device that conditions the fluid to a desired quality. The cylinder 32 or cylinders have at least one, and preferably more, openings 34. The openings 34 are positioned along the length of the cylinders 32 in spaced relation and in a preferred embodiment have a screen 36 that covers the opening 34.

The container 12 may also have a divider 20 that separates the grain mass from the lower plenum 22. Positioned adjacent the inlet port 13, and the exhaust port 15, as well as within the grain mass 11, are a plurality of sensors 30, 112, 114. The sensors 30, 112, 114 detect information about the status or characteristics of the grain mass 11, such as temperature or humidity and operating parameters of the system 10. A baffle 38 is connected to the exterior of the cylinder 32. The baffles are positioned above the openings 34 and extend outwardly and downwardly to deflect grain 11 away from the openings 34 while the grain mass 11 is placed around the cylinder 32.

Disposed within the cylinder 32 are a plurality of vents 40. The vents 40 are of any size, shape, and structure and include any device adapted to selectively seal the flow of fluid in the cylinder 32, either allowing or preventing the fluid to flow through the openings 34 and into the grain mass 11 or from the grain mass 11 into the openings 34 and into the cylinder 32.

In a similar embodiment, also disposed within the cylinders 32, adjacent to and above and/or below the vents 40, is at least one, and preferably more, gates 52. The vents 40, sensors 30, and gates 52 are connected to and controlled by a computer 42. The computer 42 has a processor, memory, monitor, input device, display, and network interface.

The gates 52 are of any size, shape, and structure. In one example, the gates 52 are disposed within a cylinder 32 having an inner surface 46. The gates, having outer surface 44, span the width of the cylinder 32. To allow the transmission of pressurized air past the gate 52 there are a plurality of radially spaced barbs 48, each adapted to receive an air hose or tube 50. The gate 52 has housing 54 with a cylindrical side wall 54, a bottom wall 56 with a central opening 58, and an open top 60. A pneumatic actuator 62 is mounted within the housing 54 by a plurality of cross-supports 63 and extends out of the open top 60. The actuator 62 has a spring-loaded piston 64 that is adapted to move in and out of a sleeve 66. One of the air tubes 50A is connected to the sleeve 66 to selectively provide pressurized air to the actuator 62 from a source of pressurized air 68. Attached to an end 70 of the piston 64 is a plug 72. The plug 72 is positioned and sized to selectively fill and seal the opening 58 in the bottom wall 56 of the housing of gate 52 to seal the opening 58.

Positioned above and/or below each gate 52, within cylinder 32, is a vent assembly 74. The vent assembly 74 is of any size, shape, and structure. In the example shown the vent assembly 74 has a plurality of flaps 76 connected to a central connector 78 by links 80. The flaps 76 have an inner surface 82 and a top edge 84. The links 80 are pivotally connected at a first end 86 to the central connector 78 and pivotally connected at a second end 88 to the inner surface 82 of the flap 76.

The cylinder 32, adjacent the flaps 76, has an outwardly extending cuff 90. The cuff 90 has a first or top wall 92 that extends outwardly in relation to a vertical axis of the cylinder 32 to a transition point 94, and a second, or bottom wall 96 that extends from the transition point 94 back toward the vertical axis of the cylinder 32 to provide a generally triangular cross-section.

The first wall 92 is angled from the cylinder 32 to the transition point 94 to prevent grain from sitting on the wall 92. The cylinder 32 has a plurality of openings 98 that align with the flaps 76. The second wall 96 angles downwardly from the transition point 94 to the cylinder 32, preferably at the angle of repose, and is perforated.

The central connector 78 is connected to a second pneumatic actuator 100. The second pneumatic actuator 100 is positioned above the central connector 78 and mounted to the inner surface 44 of the cylinder 32. Like the first actuator 62, the second actuator 100 has a spring-loaded piston 64 that is adapted to move in and out of a sleeve 66. One of the air tubes 50B is connected to the sleeve 66 to selectively provide pressurized air to the sleeve 66. The central connector 78 is connected to an end 70 of the piston 64.

The gates 52 and vent assemblies 74 are vertically spaced within the cylinders 32 and define horizontal tiers 102 within the container 12. The vertical cylinders 32 define vertical regions 104 between the cylinders 32 and between the cylinders and an outer side wall 106 of the container 12. The combination of tiers 102 and regions 104 define sections 108 within the grain mass.

In operation, the sensors 30 detect information about the grain mass 11 and transmits this information to the computer 42 where the information is stored. In one embodiment the information is sent to a cloud based storage where the information is combined with information from other saturation systems. The combined information is processed and analyzed and can be used by each system to improve the saturation process and efficiency as well as artificial intelligence for each system.

The sensed information is also processed and analyzed to dynamically determine and create a flow pattern through the grain mass. As an example, the sensors 30 send information regarding the status and characteristics of the grain mass 11, such as temperature and humidity, to the computer 42. The computer 42 uses this information to determine conditions of the grain mass 11, such as moisture content, and operating parameters of the system 10, such as flow rate. The computer 42 compares the determined condition and/or parameter with a predetermined condition and/or parameters that is stored within the computer. Stored information may include, but is not limited to, time parameters, historical data, external data from other sources including information from other saturating systems, user inputs, weather conditions and any combinations thereof.

Based upon the comparison, the computer activates various vents 40 and/or gates to open or close to direct the flow pattern of the fluid through the medium in an efficient manner. The vents 40 and gates 52 are activated electrically, hydraulically, mechanically, pneumatically or any combination thereof. In particular, software and processor also determines target section 110 which is the section 108 to be saturated such as the section with the highest moisture content. Based upon the identified target section 110 the computer 42, through electrical signal or the selective release of pressurized air from the source of pressurized air 68 activates selected gates 52 and vent assemblies 74.

The number of flow patterns is unlimited based upon the various combination of cylinders 32, vents 40, and gates 52 and include both two dimensional flow patterns such as a triangle, and three dimensional flow patterns such as a pyramid with n-number of legs. Any conceivable shape of flow pattern can be created.

In one example, using one cylinder 32 a first vent 40A or 74A (used interchangeably) is positioned below a second vent 74B in spaced relation. With both vents open, fluid will flow through the air cylinder 32 from the inlet port 13 to the exhaust port 15. With vent 74A open, some fluid will flow out of cylinder 32 through vent 74A and into the grain mass 11. Since vent 74B is also open, the fluid in the grain mass 11 will flow through vent 74B into cylinder 32 and to exhaust port 15.

Figure 8:
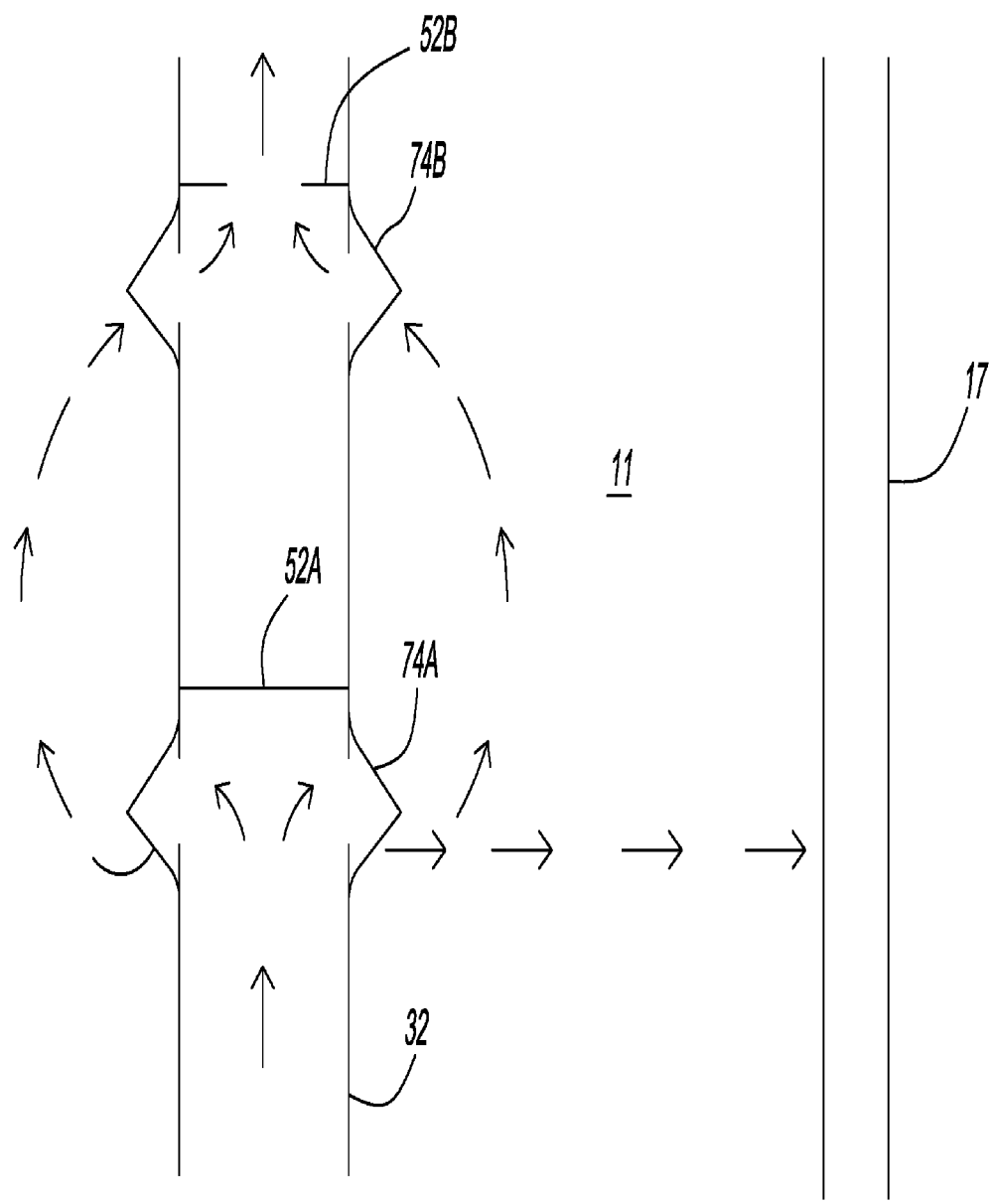
FIG. 8 is a side sectional view of a fluid flow pattern.

To enhance this flow pattern, gates 52A and 52B are positioned adjacent vents 74A and 74B as in FIG. 8. With gate 52A closed, all fluid is forced through vent 74A into the grain mass 11. With gate 52B open, fluid is drawn back through vent 74B, into cylinder 32, and to exhaust port 15. To obtain an additional, more horizontal or transverse flow pattern, perforated tubes 17 are positioned in vertical spaced relation to the cylinder 32. As a result, some fluid flows from vent 74A across the grain mass 11 to the perforated tube 17.

In another example, using multiple cylinders 32, the vents 74 and gates 52 are activated to a target section between the cylinders 32.

Figure 6:
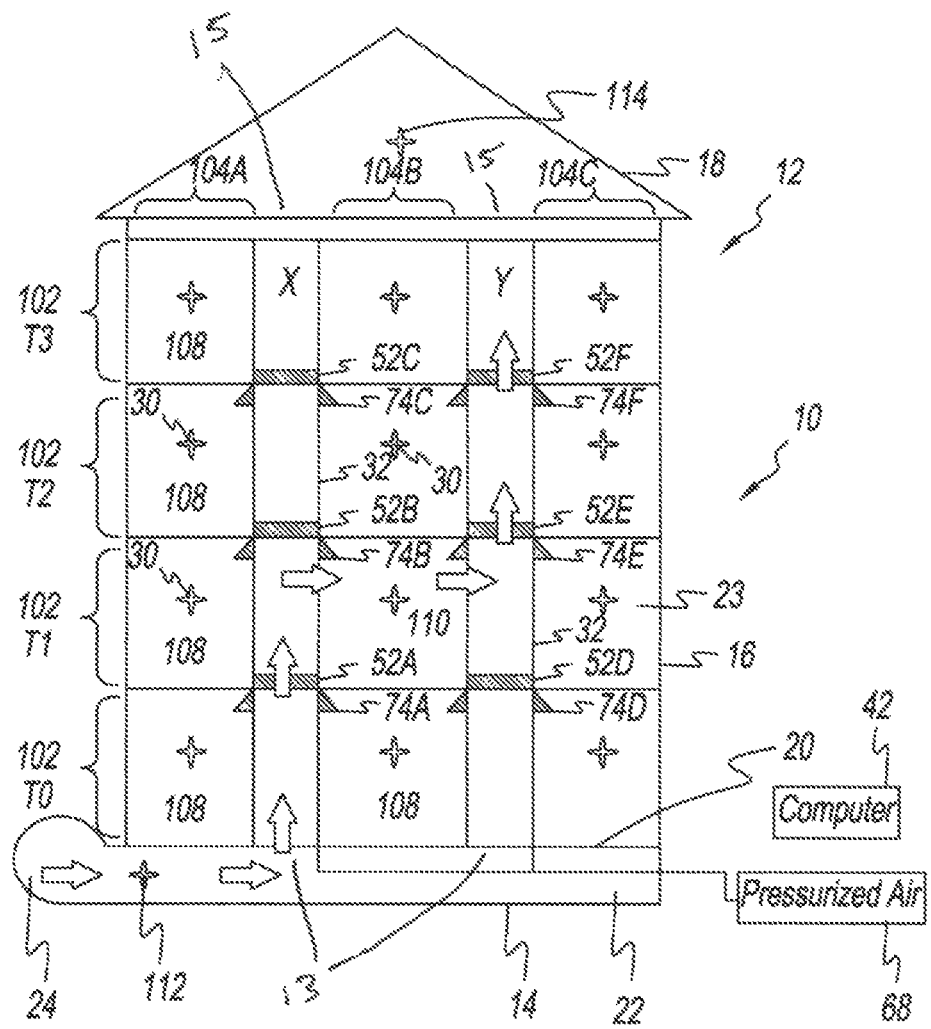
FIG. 6 is a side sectional view of a saturating assembly.
Figure 7:
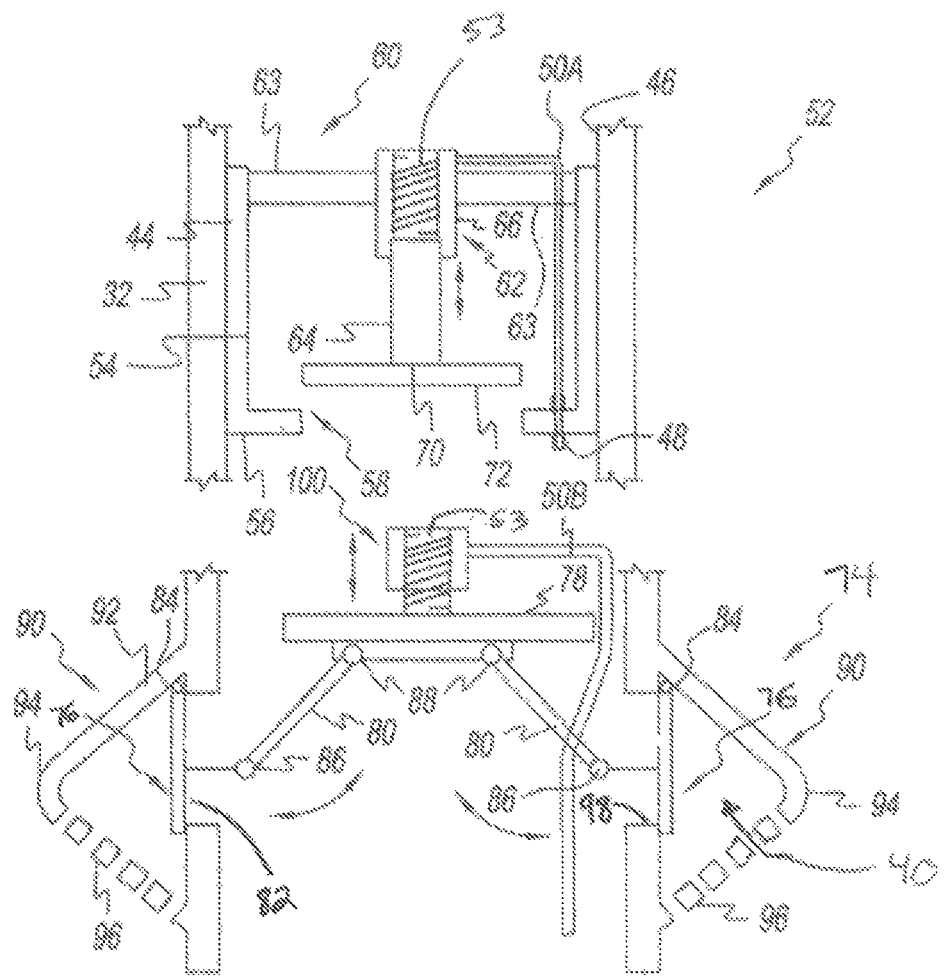
FIG. 7 is a side sectional view of a gate and a vent assembly.

For example, as shown in FIG. 6, the tiers 102 are represented by T0, T1, T2, and T3, while the regions 104 are represented by A, B, C. The target section 110 is positioned in the section where tier T1 crosses region B.

The assembly has two cylinders 32 shown as X and Y, with each cylinder having vertically spaced gates 52A, 52B, 52C, 52D, 52E and 52F, with each gate having a vent assembly 74A, 74B, 74C, 74D, 74E, and 74F positioned adjacent and below each gate respectively.

To direct influent, air that has yet to dry the grain mass, to the target section, in the example shown, gates 52A, 52E, and 52F are opened while the remaining gates stay in a normally closed, spring-biased, position 53. At the same time, vent assemblies 74B and 74E are opened while the remaining vent assemblies remain in a normally closed, spring-biased, position 53. As a result, an air flow path is created such that influent flows from the fan 24 through heater 28 or other conditioning devices and into cylinder 32X and past open gate 52A and closed vent assembly 74A to closed gate 52B and open vent assembly 74B.

The influent is then drawn horizontally in a straight line into the target section 110 through open vent assembly 74B toward open vent assembly 74E. The effluent, air that has dried the grain mass, flows into cylinder 32Y through vent assembly 74E and past open gate 52E and 52F and closed vent assembly 74F and is discharged from cylinder 32Y. Flow into cylinder 32Y from the inlet port 13 is restricted by closed gate 52D.

Figure 9:
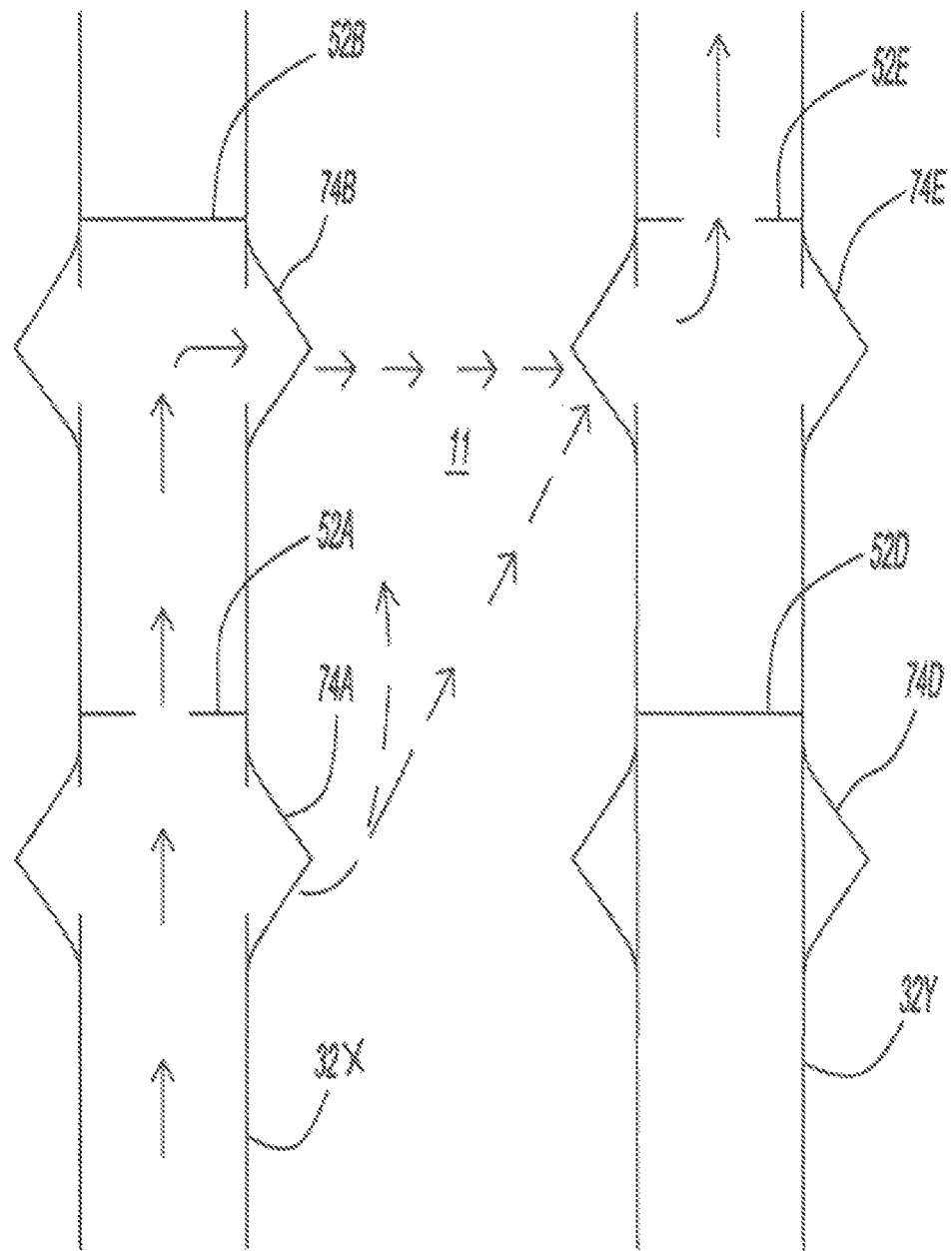
FIG. 9 is a side sectional view of a fluid flow pattern.
Figure 10:
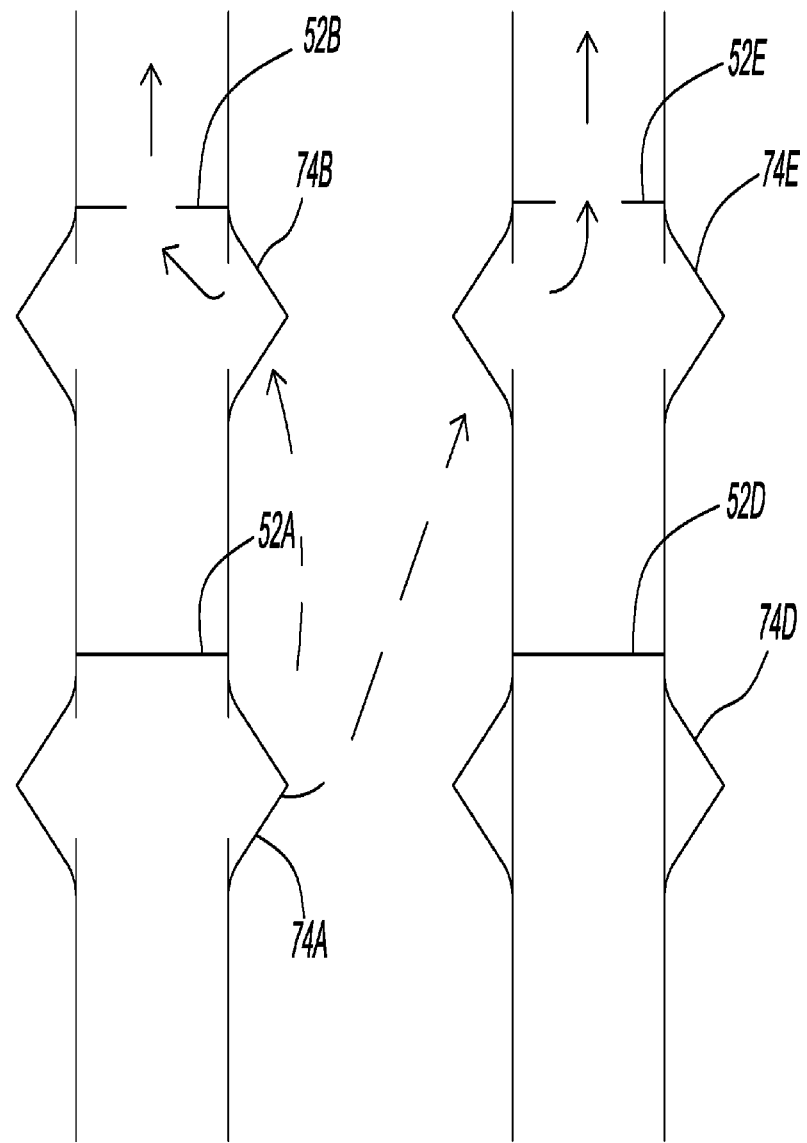
FIG. 10 is a side sectional view of a fluid flow pattern.

The flow pattern may be further expanded by opening more vents 74 in cylinder 32X, cylinder 32Y, or both as in FIG. 9. For example, in addition to vent 74B and gates 52A and 52E being open, by opening vent 74A, the flow pattern changes from a line to a triangle. More specifically, some fluid will flow from vent 74A at an angle to vent 74E and some fluid will flow from vent 74B straight across to vent 74E. A modified flow pattern would be created as in FIG. 10 by closing gate 52A and 52D and opening gates 52B and 52E. As a result some fluid would flow from vent 74A to 74B and some would flow from vent 74A to vent 74E. After reaching vents 74B and 74E, the effluent would be unrestricted to exit the system through exhaust port 15.

Figure 11:
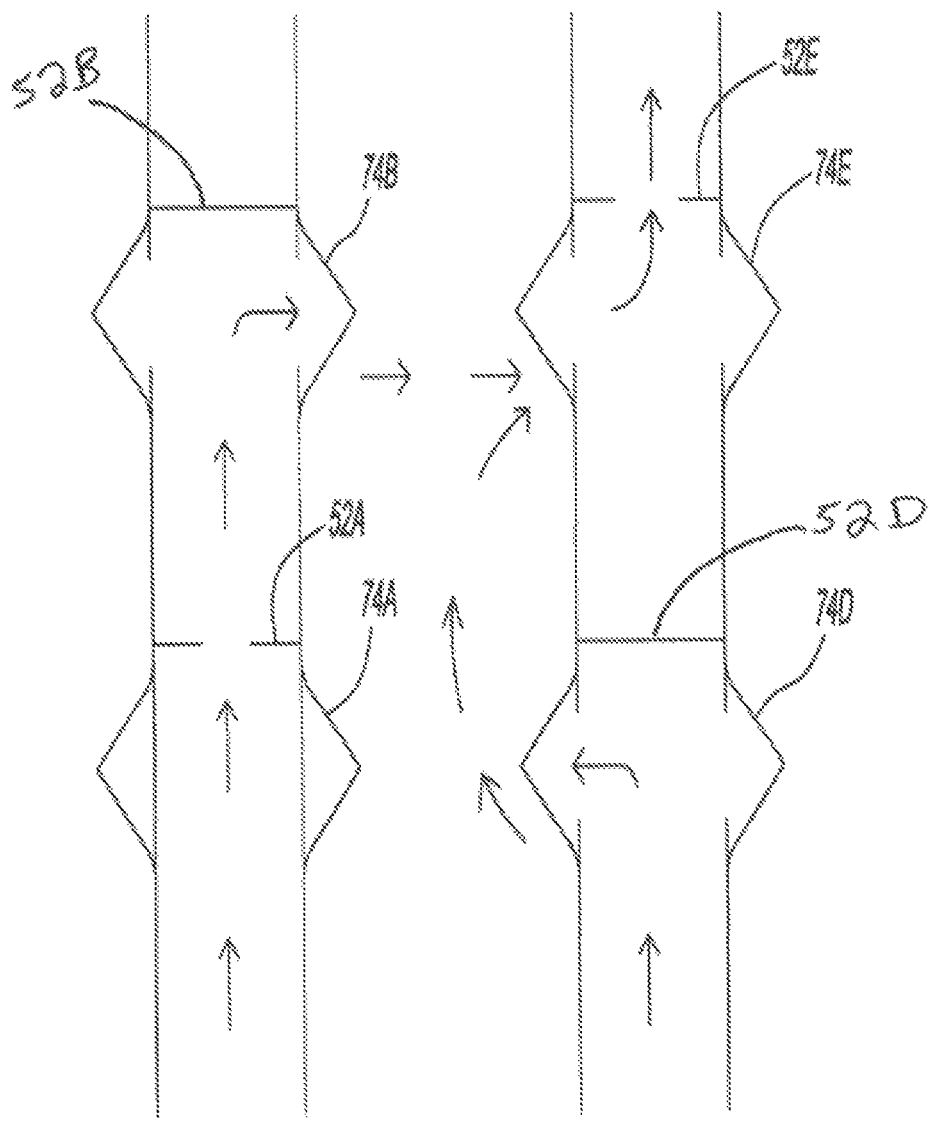
FIG. 11 is a side sectional view of a fluid flow pattern.
Figure 12:
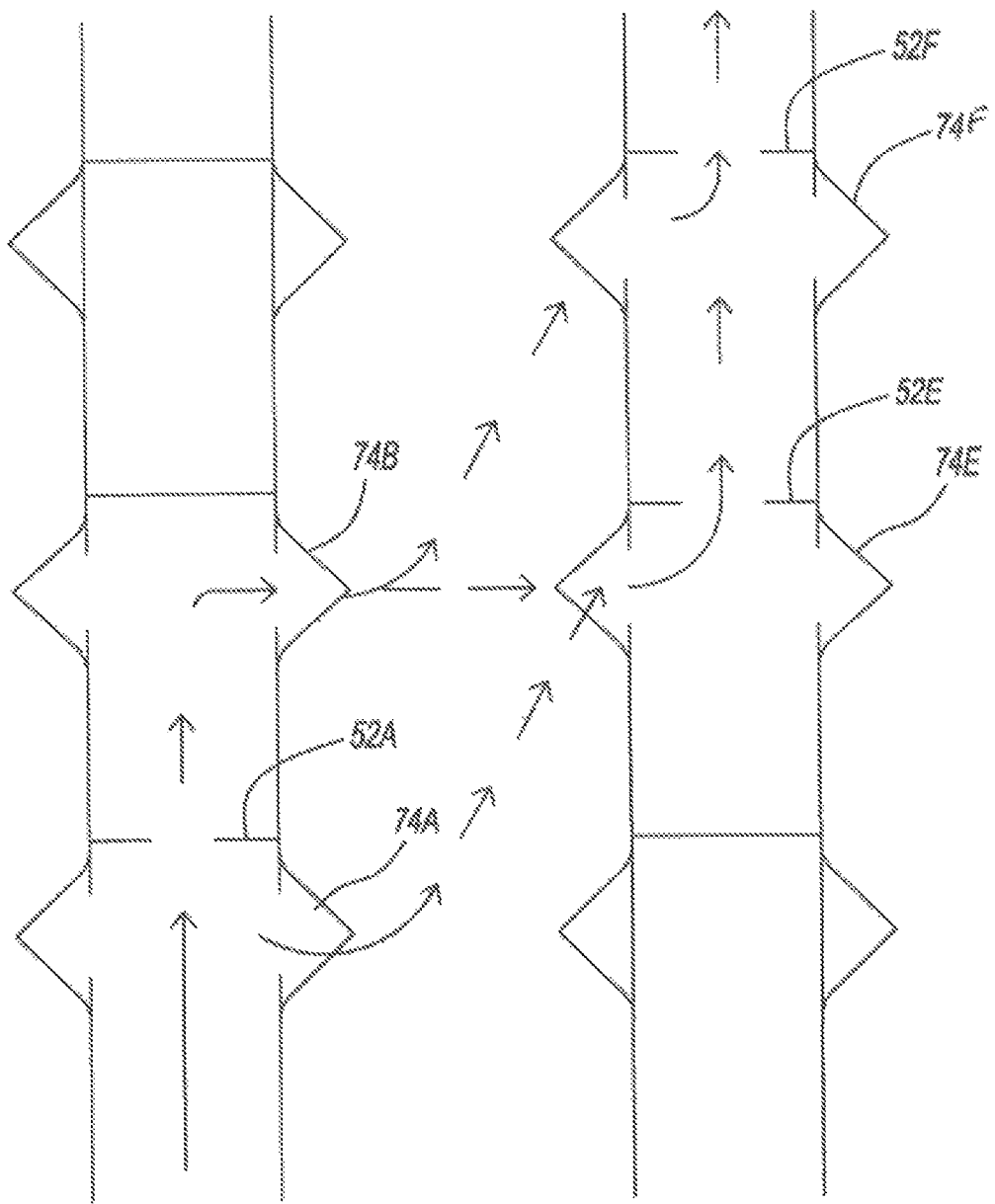
FIG. 12 is a side sectional view of a fluid flow pattern.

Another modified flow pattern as in FIG. 11 would be created by closing vent 74A and opening vents 74B, 74D, and 74E while opening gates 52A and 52E and closing gates 52B and 52D. As a result, some fluid would flow from vent 74D toward both vents 74B and 74E but only through vent 74E and fluid would flow from vent 74B both toward and through 74E.

In yet another modified flow pattern as in FIG. 11, vents 74A, 74B, 74E and 74F are open as are gates 52A, 52E, and 52F. As a result fluid flows at an angle from vent 74A to vent 74E and 74B to 74F forming a polygon shaped flow pattern.

Any flow pattern could be adjusted to avoid short circuiting a target section 110. This is done by lowering the flow through any vent by partially opening the vent or adjusting the air flow in one cylinder relative to the other. Also, the height of the vents 74 and gates 52 are changed to modify flow patterns. Finally, conduits can be connected to and be in communication with multiple cylinders particularly at the input port.

The modification of flow patterns is useful for a number of reasons. The ability to change the flow pattern to adapt to changing conditions within the grain mass as detected by the sensors or as otherwise ascertained by historical data, outside data or human input. Artificially creating a smaller grain depth and/or horizontal flow profile diminishes the energy required to drive fluid through the grain mass. Controlling the height and direction of flow patterns allows the drying front to be effectively and artificially moved through the grain mass, causing the time to dry the grain to be dependent on a controlled system and not equilibrium. Varying flow through different sections of the grain mass allows the sections to be dried to a precise predetermined level, no more, no less, throughout the entire grain mass.

Data from other grain masses may be used also to check for errors in the system, as well as other reasons. For example, the data may be used to preemptively aerate certain sections of the grain mass based upon data from statistically similar grain masses which appear to be at risk of spoilage. The data may also be used to replace detected information from a failed sensor.

The computer 42 modifies the flow pattern when target sections obtain desired conditions. Moisture content, number of hotspots and other relevant data is collected over the course of a storage season to create new protocols and a score sheet of the value of the grain mass. This might be done to mathematically estimate the theoretical dry matter loss of the grain in the mass. This could be done over the course of a few storage seasons and compared to the actual value of the grain as sold in the market to improve the accuracy of the estimate. This could be done in absolute terms as it relates to the specific quality of the grain in that mass, or as in relative terms comparing it to the grain in other grain masses, or both. The data used to provide a relative estimate of the value of the grain could also be used to provide research on the grain market. The data is also used by the computer 42 to develop machine learning through artificial intelligence. The computer, based on both internal and external data will anticipate and create flow patterns that protect the grain mass, reduce drying time, and reduce energy consumption.

Accordingly, an assembly for saturating a medium with fluid which includes an assembly for drying a grain mass with influent has been disclosed that, at the very least, meets the stated objectives

The invention claimed is:

1. A method of manipulating a flow of air within a grain mass, comprising:

controlling multiple vent assemblies coupled to multiple ducts within a container in which a grain mass is stored and embedded within the grain mass extending from a plenum to a headspace, and positioned along a length of each duct of the multiple ducts within the container, each vent assembly having a vent and a gate that selectively open and close portions of each duct along the length thereof to selectively restrict a flow of air through each duct and into and out of specific sections of the grain mass at different portions of each duct, the multiple ducts spanning an entire length of the grain mass, allowing a flow of air into each duct as the flow of air enters the grain mass, and exiting out from the grain mass to allow the flow of air to have a path that is unrestricted by at least a section of the grain mass, wherein the multiple vent assemblies are automatically and selectively activated to deliver specific air flow patterns through a selective release of the flow of air, in which a first duct in the multiple ducts permits the flow of air into the grain mass from a lower vent assembly, and wherein a higher vent assembly of the first duct or of at least one additional duct permits the flow of air from the grain mass and out through an exhaust port above the grain mass in one or both of the first duct or the at least one additional duct, to target a specific section of the grain mass, and wherein one or more fans enable the flow of air to the grain mass through the multiple ducts, the multiple ducts providing the path for the flow of air from a bottom of the multiple ducts to a top of the multiple ducts that eliminates the flow of air having to pass entirely and only through the grain mass itself.

2. The method of claim 1, further comprising determining temperature and moisture content of the grain mass, temperature, relative humidity, and carbon dioxide of air surrounding the grain mass, and temperature, relative humidity, and carbon dioxide of air flowing into and out of a portion of the container in which the grain mass is stored, from information collected by one or more sensors.

3. The method of claim 2, further determining a condition of the grain mass, and properties of the air flowing into and out of the portion of the container in which the grain mass is stored, to define a height, a direction, and a flow rate of specific flow patterns for the flow of air to specific sections of the grain mass.

4. The method of claim 3, further comprising modifying the specific air flow patterns for the flow of air, in response to the condition of the grain mass.

5. The method of claim 3, wherein the specific air flow patterns are delivered to the grain mass in one of a horizontal direction, a vertical direction, and an angular direction relative to a position of the ducts.

6. The method of claim 3, wherein the determining the properties of the air flowing into and out of the portion of the container in which the grain mass is stored is performed to assess whether to treat the flow of air by one or more of heating the flow of air, cooling the flow of air, adjusting the temperature, adjusting the one or more fans to either increase or decrease the flow rate, and introducing treatments into the flow of air, prior to directing the flow of air to the grain mass.

7. The method of claim 3, wherein the determining the condition of the grain mass further comprises continually tracking the condition of the grain mass over time from characteristics of the grain mass or the properties of the flowing into and out of the portion of the container in which the grain mass is stored.

8. The method of claim 7, further comprising calculating a value of the grain mass from the condition of the grain mass over time, the value of the grain mass including one or more of a dry matter loss of the grain mass, an estimated market value of the grain, and a remaining storage life.

9. The method of claim 7, wherein the characteristics of the grain mass are particular to the specific sections of the grain mass.

10. A system for manipulating a flow of air within a grain mass, comprising:

an assembly comprised of multiple vent assemblies coupled to multiple ducts within a container in which a grain mass is stored and embedded within the grain mass extending from a plenum to a headspace, and positioned along a length of each duct of the multiple ducts within the container, each vent assembly having a vent and a gate that selectively open and close portions of each duct along the length thereof, the multiple ducts spanning an entire length of the grain mass, allowing a flow of air into each duct as the flow of air enters the grain mass, and exiting out from the grain mass to allow the flow of air to have a path that is unrestricted by at least a section of the grain mass;

one or more processors configured to control the multiple vent assemblies to selectively restrict the flow of air through each duct and into and out of specific sections of the grain mass at different portions of each duct, wherein the multiple vent assemblies are automatically and selectively activated to deliver specific air flow patterns through a selective release of the flow of air, in which a first duct in the multiple ducts permits the flow of air into the grain mass from a lower vent assembly, and wherein a higher vent assembly of the first duct or of at least one additional duct permits the flow of air from the grain mass and out through an exhaust port above the grain mass in one or both of the first duct or the at least one additional duct, to target a specific section of the grain mass; and one or more fans configured to deliver the flow of the air to the multiple ducts, wherein an air conditioning system enables the flow of air to the grain mass through the multiple ducts, the multiple ducts providing the path for the flow of air from a bottom of the multiple ducts to a top of the multiple ducts that eliminates the flow of air having to pass entirely and only through the grain mass itself.

11. The system of claim 10, wherein temperature and moisture content of the grain mass, temperature, relative humidity, and carbon dioxide of air surrounding the grain mass, and temperature, relative humidity, and carbon dioxide of air flowing into and out of a portion of the container in which the grain mass is stored, are determined from information collected by one or more sensors.

12. The system of claim 11, wherein the one or more processors are further configured to determine a condition of the grain mass, and properties of the air flowing into and out of the portion of the container in which the grain mass is stored, to define a height, a direction, and a flow rate of specific flow patterns for the flow of air to specific sections of the grain mass.

13. The system of claim 12, wherein the one or more processors are further configured to modify the specific air flow patterns for the flow of air, in response to the condition of the grain mass.

14. The system of claim 12, wherein the specific air flow patterns are delivered to the grain mass in one a horizontal direction, a vertical direction, and an angular direction relative to a position of the ducts.

15. The system of claim 12, wherein the properties of the air flowing into and out of the portion of the container in which the grain mass is stored are utilized to assess whether to treat the flow of air by one or more of heating the flow of air, cooling the flow of air, adjusting the temperature, adjusting the one or more fans to either increase or decrease the flow rate, and introducing treatments into the flow of air, prior to directing the flow of air to the grain mass.

16. The system of claim 12, wherein the one or more processors are further configured to continually track the condition of the grain mass over time from characteristics of the grain mass and the properties of the flowing into and out of the portion of the container in which the grain mass is stored.

17. The system of claim 16, the one or more processors are further configured to calculate a value of the grain mass from the condition of the grain mass over time, the value of the grain mass including one or more of a dry matter loss of the grain mass, an estimated market value of the grain, and a remaining storage life.

18. The system of claim 16, wherein the characteristics of the grain mass are particular to the specific sections of the grain mass.

* * * * *